April 25, 1939. J. C. BISHOP 2,155,466
TOOL FOR APPLYING EMERGENCY CHAINS TO AUTOMOBILE TIRES
Filed June 14, 1937
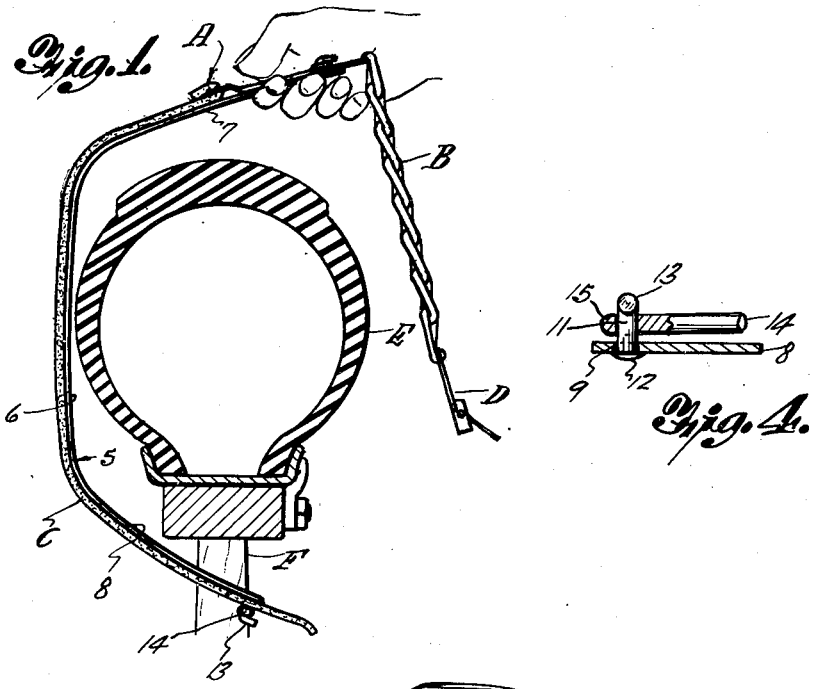
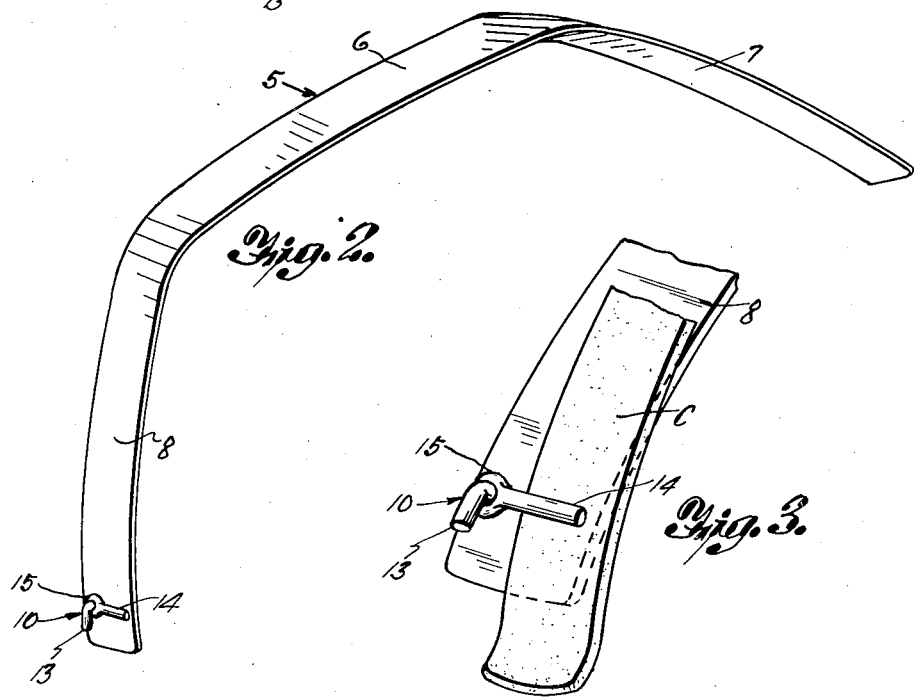
Inventor
JOHN C. BISHOP
By Adam E. Fisher
Attorney Patented Apr. 25, 1939

2,155,466

UNITED STATES PATENT OFFICE 2,155,466

TOOL FOR APPLYING EMERGENCY CHAINS TO AUTOMOBILE TIRES

John C. Bishop, Savannah, N. Y.

Application June 14, 1937, Serial No. 148,002

1 Claim. (Cl. 81—15.8)

My invention provides a tool for applying emergency chains to automobile tires.

In the use of the common emergency chains which consist of a length of double chain for wrapping around the tire crosswise and a fastening strap and buckle for holding the chain it is frequently necessary to apply these chains out on the road and with the tires muddy and wet. This is a laborious task and especially with the newer large balloon tires it is almost impossible to place the chain around the inside of the tires and back through the wheel without the shirt or coat sleeve coming in contact with the tire and becoming soiled thereby.

With the foregoing in view it is the main object of my invention to provide a tool in the form of a long bowed or arcuate member to one end of which the chain may be connected so that by grasping the other end in the hand the chain may be passed around the tire and back through the wheel without the wrist or arm coming at all near the tire and to so prevent soiling the clothes.

Another object is to provide a tool of this kind in a simple and inexpensive form comprising only an elongated arcuate or wide U-shaped strip having at one end an L-shaped hook and a clasp finger pivoted thereon so that either the chain itself or its fastening strap may be engaged and forced around the tire.

With these and other objects in view the invention resides in the novel construction and arrangement of parts as hereinafter fully set forth and claimed, reference being had to the accompanying drawing as showing a preferred embodiment of my invention for purposes of exemplification.

In the drawing:

Figure 1 is a fragmental cross section through a tire and wheel and illustrating the manner in which my tool is used for applying a chain thereto.

Figure 2 is an enlarged perspective view of my tool alone.

Figure 3 is a further enlarged fragmentary perspective view of my tool showing the connection of the chain fastening strap thereto.

Figure 4 is a cross section through the strip showing the mounting of the chain engaging members.

Referring now with more particularity to the drawing the reference character A designates an emergency chain of well known form, the same comprising a length of double chain B, a strap C and a buckle D and being adapted to wrap crosswise around the automobile tire E with the chain B over the tire tread and the strap C passed through the wheel F. To so mount the chain at present it is necessary to work the chain by hand around the inside of the tire and back through the wheel and as will be readily evident this is practically impossible to do without bringing the arm into contact with the muddy or dirty tire. This is especially true with the balloon tires of large cross sectional circumference as now universally used.

My invention as exemplified in the drawing provides an elongated arcuate member or strip 5 which will serve as an extension arm for working the chain around the tire as will be described. The member 5 is made of strip metal or material of suitable thickness and of substantial width and is formed into a bowed, arcuate or wide U-shaped structure including a wide bight or center portion 6, a handle end or arm 7 and the working or frontal end or arm 8. Adjacent the extremity of the arm 8 an aperture 9 is punched and an L-shaped chain hook 10 is journaled therein, the shank 11 thereof being placed through the aperture 9 and upset as at 12 to hold it in place while the hook prong or finger 13 extending at right angles lies parallel with the face of the arm 8. A strap engaging finger 14 is journaled by its eye 15 on the hook shank 11 between the prong 13 and the arm 8. It will be noted that the aperture 9 is located adjacent one lateral edge of the arm 8 and thus the finger 14 extending toward the opposite edge crosswise to the length of the arm will overlie a substantial portion of the width of the arm.

In use the chain strap C may be engaged with my tool 5 by slipping its end beneath the finger 14 as shown in Figure 3 where it will be held by frictional engagement between the finger and the arm 8. The strap C and chain B may then be pulled back over the tool lying on the bight 6 and over the arms 7 and 8 and the hand grasping the chain and arm 7 will hold the chain and tool together. The arm 8 may then be placed over the tire E and passed around the inside thereof until it may be seen through the wheel F after which a further movement will project the arm 8 through the wheel until the strap C may be detached. The tool is then removed and the two ends of the chain drawn together and secured by the buckle D. The bowed or arcuate shape of the tool allows it to fit or embrace the contour of the tire closely as shown so that when the arm 8 projects outwardly through the wheel F the handle end 7 still clears the tire E substantially thus preventing the hand or arm from coming into contact with the tire as will be readily evident. In some tire chains it may be necessary to attach the tool to the chain itself in which case the hook prong 13 may be readily engaged with a link of the chain (not shown).

Of course the tool may be made in any length and shape according to the size of tire upon which it is to be used although a single size of tool may be successfully used on tires of a wide range of sizes.

While I have herein set forth a certain preferred embodiment of my invention it is understood that I may vary from the same in minor structural details so as best to provide a practical device for the purposes intended, not departing from the spirit of the invention and within the scope of the appended claim.

I claim:

In a tool for applying emergency tire chains of the type comprising dual chains and a fastening strap therefor, an elongated bowed strip, a strap engaging hook journaled adjacent one end of the strip, and a strap engaging clasp finger journaled on the hook.

JOHN C. BISHOP.